(12) United States Patent
Kumarasamy

(10) Patent No.: US 10,514,853 B2
(45) Date of Patent: *Dec. 24, 2019

(54) LIGHTWEIGHT MOUNTING OF A SECONDARY COPY OF FILE SYSTEM DATA

(71) Applicant: Commvault Systems, Inc., Tinton Falls, NJ (US)

(72) Inventor: Paramasivam Kumarasamy, Morganville, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,741

(22) Filed: May 23, 2018

(65) Prior Publication Data

US 2018/0335965 A1 Nov. 22, 2018

Related U.S. Application Data

(63) Continuation of application No. 15/282,894, filed on Sep. 30, 2016, now Pat. No. 10,007,453, which is a
(Continued)

(51) Int. Cl.
*G06F 17/30* (2006.01)
*G06F 3/06* (2006.01)
(Continued)

(52) U.S. Cl.
CPC ............ *G06F 3/0619* (2013.01); *G06F 3/065* (2013.01); *G06F 3/067* (2013.01); *G06F 16/113* (2019.01);
(Continued)

(58) Field of Classification Search
CPC ...... G06F 3/0619; G06F 16/14; G06F 16/113; G06F 16/119; G06F 16/148; G06F 16/1844; G06F 3/065; G06F 3/067
See application file for complete search history.

(56) References Cited

U.S. PATENT DOCUMENTS 4,084,231 A 4/1978 Capozzi et al.
4,267,568 A 5/1981 Dechant et al.
(Continued)

FOREIGN PATENT DOCUMENTS

AU 2004227949 10/2004
CA 2498174 3/2004
(Continued)

OTHER PUBLICATIONS

Arneson, "Mass Storage Archiving in Network Environments" IEEE, Oct. 31-Nov. 1998, pp. 45-50.
(Continued)

*Primary Examiner* — Debbie M Le
(74) *Attorney, Agent, or Firm* — Knobbe Martens Olson & Bear LLP

(57) ABSTRACT

A data storage system allows a user to search a secondary copy such as a back up, archive, or snapshot and receive an abbreviated version of the secondary copy of the file system as a result of the search. The abbreviated version of the secondary copy of the file system may include metadata such as a listing of secondary copy data that correspond with a search term or other filtering criteria provided by the user. An operating system of the user's computing device may mount the abbreviated version so that it can be displayed within a view of the file system of the computing device. Once a user selects one or more desired data objects listed in the abbreviated version, the selected actual one or more data objects are retrieved from secondary storage.

22 Claims, 10 Drawing Sheets

Related U.S. Application Data continuation of application No. 14/675,543, filed on Mar. 31, 2015, now Pat. No. 9,483,478, which is a continuation of application No. 13/789,217, filed on Mar. 7, 2013, now Pat. No. 9,026,498.

(60) Provisional application No. 61/682,586, filed on Aug. 13, 2012.

(51) Int. Cl.
    *G06F 16/14* (2019.01)
    *G06F 16/11* (2019.01)
    *G06F 16/182* (2019.01)

(52) U.S. Cl.
    CPC ............ *G06F 16/119* (2019.01); *G06F 16/14* (2019.01); *G06F 16/148* (2019.01); *G06F 16/1844* (2019.01)

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,542,972 B2 | 4/2003 | Ignatius et al. | |
| 6,658,436 B2 | 12/2003 | Oshinsky et al. | |
| 6,721,767 B2 | 4/2004 | De Meno et al. | |
| 6,760,723 B2 | 7/2004 | Oshinsky et al. | |
| 7,003,641 B2 | 2/2006 | Prahlad et al. | |
| 7,035,880 B1 | 4/2006 | Crescenti et al. | |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,209,972 B1 | 4/2007 | Ignatius et al. | |
| 7,246,207 B2 | 7/2007 | Kottomtharayil et al. | |
| 7,315,923 B2 | 1/2008 | Retnamma et al. | |
| 7,315,924 B2 | 1/2008 | Prahlad et al. | |
| 7,343,453 B2 | 3/2008 | Prahlad et al. | |
| 7,380,072 B2 | 5/2008 | Kottomtharayil et al. | |
| 7,389,311 B1 | 6/2008 | Crescenti et al. | |
| 7,395,282 B1 | 7/2008 | Crescenti et al. | |
| 7,401,154 B2 | 7/2008 | Ignatius et al. | |
| 7,409,509 B2 | 8/2008 | Devassy et al. | |
| 7,440,982 B2 | 10/2008 | Lu et al. | |
| 7,447,692 B2 | 11/2008 | Oshinsky et al. | |
| 7,454,569 B2 | 11/2008 | Kavuri et al. | |
| 7,484,054 B2 | 1/2009 | Kottomtharayil et al. | |
| 7,490,207 B2 | 2/2009 | Amarendran et al. | |
| 7,500,053 B1 | 3/2009 | Kavuri et al. | |
| 7,529,782 B2 | 5/2009 | Prahlad et al. | |
| 7,536,291 B1 | 5/2009 | Vijayan Retnamma et al. | |
| 7,543,125 B2 | 6/2009 | Gokhale | |
| 7,546,324 B2 | 6/2009 | Prahlad et al. | |
| 7,552,358 B1 | 6/2009 | Asgar-Deen et al. | |
| 7,581,077 B2 | 8/2009 | Ignatius et al. | |
| 7,603,386 B2 | 10/2009 | Amarendran et al. | |
| 7,606,844 B2 | 10/2009 | Kottomtharayil | |
| 7,613,748 B2 | 11/2009 | Brockway et al. | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,680,843 B1 | 3/2010 | Panchbudhe et al. | |
| 7,739,459 B2 | 6/2010 | Kottomtharayil et al. | |
| 7,747,579 B2 | 6/2010 | Prahlad et al. | |
| 7,757,043 B2 | 7/2010 | Kavuri et al. | |
| 7,769,961 B2 | 8/2010 | Kottomtharayil et al. | |
| 7,801,864 B2 | 9/2010 | Prahlad et al. | |
| 7,802,067 B2 | 9/2010 | Prahlad et al. | |
| 7,809,914 B2 | 10/2010 | Kottomtharayil et al. | |
| 8,055,627 B2 | 11/2011 | Prahlad et al. | |
| 8,156,086 B2 | 4/2012 | Lu et al. | |
| 8,170,995 B2 | 5/2012 | Prahlad et al. | |
| 8,229,954 B2 | 7/2012 | Kottomtharayil et al. | |
| 8,230,195 B2 | 7/2012 | Amarendran et al. | |
| 8,285,681 B2 | 10/2012 | Prahlad et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,489,830 B2 | 7/2013 | Wu et al. | |
| 8,578,120 B2 | 11/2013 | Attarde et al. | |
| 9,026,498 B2 | 5/2015 | Kumarasamy | |
| 9,063,938 B2 * | 6/2015 | Kumarasamy | G06F 16/11 |
| 9,483,478 B2 | 11/2016 | Kumarasamy | |
| 9,773,002 B2 * | 9/2017 | Kumarasamy | G06F 16/11 |
| 10,007,453 B2 | 6/2018 | Kumarasamy | |
| 2006/0224846 A1 | 10/2006 | Amarendran et al. | |
| 2007/0079087 A1 * | 4/2007 | Wang | G06F 11/1448 711/161 |
| 2008/0066099 A1 | 3/2008 | Brodersen et al. | |
| 2008/0229037 A1 | 9/2008 | Bunte et al. | |
| 2009/0319534 A1 | 12/2009 | Gokhale | |
| 2010/0070474 A1 | 3/2010 | Lad | |
| 2010/0299490 A1 | 11/2010 | Attarde et al. | |
| 2011/0119716 A1 | 5/2011 | Coleman, Sr. et al. | |
| 2011/0161299 A1 | 6/2011 | Prahlad et al. | |
| 2011/0225133 A1 | 9/2011 | Manu et al. | |
| 2012/0150818 A1 | 6/2012 | Vijayan Retnamma et al. | |
| 2012/0150826 A1 | 6/2012 | Vijayan Retnamma et al. | |
| 2012/0179656 A1 | 7/2012 | Bunte et al. | |
| 2012/0179886 A1 | 7/2012 | Prahlad et al. | |
| 2013/0339298 A1 | 12/2013 | Muller et al. | |
| 2016/0004601 A1 | 1/2016 | Ahn et al. | |
| 2016/0004605 A1 | 1/2016 | Ahn et al. | |
| 2018/0113769 A1 | 4/2018 | Ahn et al. | |

FOREIGN PATENT DOCUMENTS

| | | |
|---|---|---|
| DE | 69415115.7 | 8/1999 |
| DE | 60020978.4 | 4/2006 |
| EP | 0259912 | 3/1988 |
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| EP | 1384135 | 1/2004 |
| GB | 2447361 | 9/2008 |
| JP | 4198050 | 12/2008 |
| JP | 4267443 | 5/2009 |
| WO | WO 95/13580 | 5/1995 |

(56) References Cited

FOREIGN PATENT DOCUMENTS

| WO | WO 99/12098 | 3/1999 |
|---|---|---|
| WO | WO 2004/023317 | 3/2004 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Huff, KL, "Data Set Usage Sequence Number," IBM Technical Disclosure Bulletin, vol. 24, No. 5, Oct. 1981 New York, US, pp. 2404-2406.
IBM Technical Disclosure Bulletin, vol. 24, No. 5, Oct. 1981 New York, US, pp. 2404-2406, K.L. Huff, "Data Set Usage Sequence Number".
Rosenblum et al., "The Design and Implementation of a Log-Structure File System," Operating Systems Review SIGOPS, vol. 25, No. 5, May 1991, New York, US, pp. 1-15.

\* cited by examiner

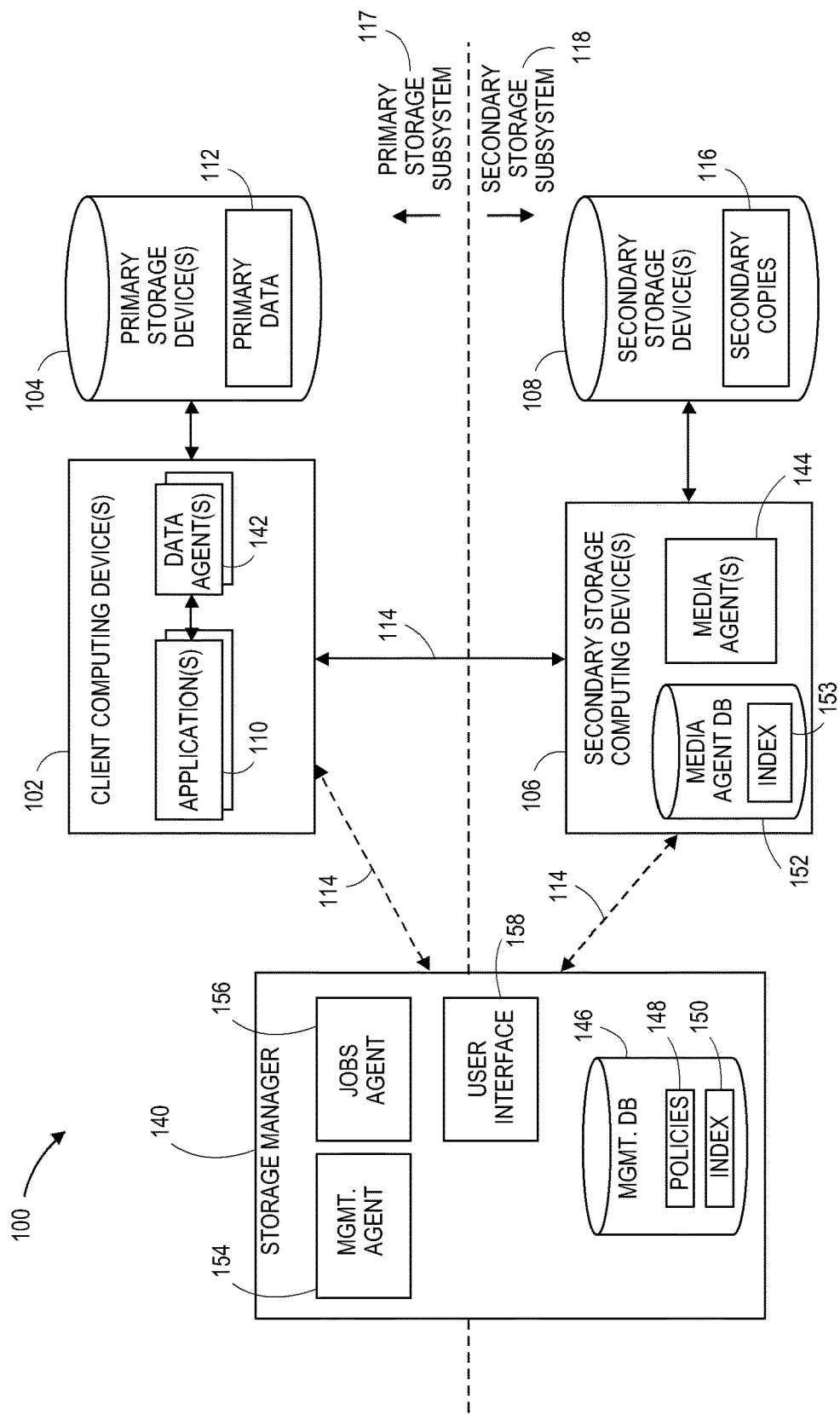

LIGHTWEIGHT MOUNTING OF A SECONDARY COPY OF FILE SYSTEM DATA

CROSS-REFERENCE TO RELATED APPLICATION

Any and all applications for which a foreign or domestic priority claim is identified in the Application Data Sheet as filed with the present application are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

As computers have become an integral part of business operations, many enterprises have come to rely on computer networks to store and backup their information. In addition, enterprises have come to rely on the ability to restore information quickly and efficiently when needed. In addition, enterprises are storing and backing up ever increasing amounts of data. Ensuring that the data can be searched and easily restored has become increasingly complex as the methods for storing and backing up data have become more sophisticated and the amount of data has increased significantly.

The increased amount of data that is backed up and stored places heavy demands on system resources. Because accessing data in secondary storage can be relatively slow and resource intensive, these demands can be especially burdensome when a user attempts to search through or restore secondary copies of production data. Likewise, users may spend significant amounts of time trying to find and retrieve the desired data.

SUMMARY

Systems and methods are described that allow a user to search through a secondary copy of data (e.g., a back up, archive, or snapshot copy of a file system) without first retrieving all of the secondary copy data. Instead, the system implements lightweight mounting of at least a portion of the secondary copy of the file system data. The mounting can also be selective, based on user-defined filtering criteria, further improving performance and improving usability. For example, the user receives an abbreviated file system as a result of a user-defined search or other filtering criteria. The abbreviated file system may include a listing of data objects in the secondary copy (e.g., files, directories, etc.) that satisfy or otherwise correspond with filtering criteria such as a search term provided by the user. An operating system of the user's computing device may mount the abbreviated file system so that it can be viewed within a file system of the computing device. Once the user selects a desired data object(s) listed in the abbreviated file system, the selected data may be retrieved from a secondary storage medium. In this manner, the system provides a user-definable filtered view of the secondary copy of the file system, without unnecessarily retrieving data objects from secondary storage, improving performance.

One aspect of the disclosure provides a networked data storage system. The networked data storage system includes a user computing device configured to transmit filtering criteria (e.g., a search term) to a media agent that is in communication with secondary storage, where the secondary storage maintains a secondary copy of at least a portion of a file system. The user computing device may be further configured to receive an abbreviated version of the secondary copy of the file system from the media agent. The abbreviated version of the secondary copy of the file system may comprise a listing of data objects in the secondary copy that are identified by the media agent as satisfying the filtering criteria. The user computing device may be further configured to mount the abbreviated version of the secondary copy of the file system. The mounted abbreviated version of the secondary copy of the file system may be displayed within a view of a file system of the user computing device.

Another aspect of the disclosure provides a method for searching a file system. The method includes transmitting, by a user computing device, filtering criteria to a media agent that is in communication with secondary storage, where the secondary storage maintains a secondary copy of at least a portion of a file system. The method further includes receiving metadata corresponding to an abbreviated version of the secondary copy of the file system from the media agent. The abbreviated version of the secondary copy of the file system may comprise a listing of data objects existing in a secondary copy of production data that is stored in secondary storage, and that are identified by the media agent as satisfying the filtering criteria. The method further includes mounting the abbreviated version of the secondary copy of the file system. The mounted abbreviated version of the secondary copy of the file system may be displayed within a view of a file system of the user computing device.

Another aspect of the disclosure provides a networked data storage system. The networked data storage system includes a storage manager configured to cause a graphical user interface to be presented on a display, where the graphical user interface includes a filter field. The networked data storage system further includes secondary storage configured to maintain a secondary copy of at least a portion of a file system. The networked data storage system further includes a media agent, in communication with the secondary storage, including a content indexing module executing on a first computing device and configured, in response to instructions from the storage manager, to receive filtering criteria entered into the filter field. The media agent is further configured to identify data objects in the secondary copy that satisfy the filtering criteria. The media agent is further configured to generate an abbreviated version of the secondary copy of the file system based on the identified data objects. The abbreviated version of the secondary copy of the file system may include a listing of data objects in the secondary copy that are identified by the media agent as satisfying the filtering criteria. The media agent is further configured to transmit the abbreviated version of the secondary copy of the file system to a second computing device. The second computing device may be configured to mount the abbreviated version of the secondary copy of the file system.

Another aspect of the disclosure provides a method for creating an abbreviated file system. The method includes causing, by a storage manager, a graphical user interface to be presented on a display, where the graphical user interface may include a filter field. The method further includes maintaining, by a secondary storage, a secondary copy of at least a portion of a file system. The method further includes, in response to instructions from the storage manager, receiving filtering criteria entered into the filter field. The method further includes identifying data objects in the secondary copy that satisfy the filtering criteria. The method further includes generating an abbreviated version of the secondary copy of the file system based on the identified data objects. The abbreviated version of the secondary copy of the file system may include a listing of data objects in the secondary copy that are identifies as satisfying the filtering criteria. The method further includes transmitting the abbreviated version of the secondary copy of the file system to a second computing device. The second computing device may be configured to mount the abbreviated version of the secondary copy of the file system.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

FIG. 1C is a block diagram of an exemplary information management system including a storage manager, one or more data agents, and one or more media agents.

DETAILED DESCRIPTION

Systems and methods are described herein for implementing lightweight mounting of a secondary copy in a data storage system. Examples of such systems and methods are discussed in further detail herein, e.g., with respect to FIGS. 2-5. Mounting of a secondary copy may additionally be implemented by information management systems such as those that will now be described with respect to FIGS. 1A-1E. And, as will be described, the componentry for implementing the secondary copy mounting techniques described herein can be incorporated into and implemented by such systems.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data. Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Figure 1A:
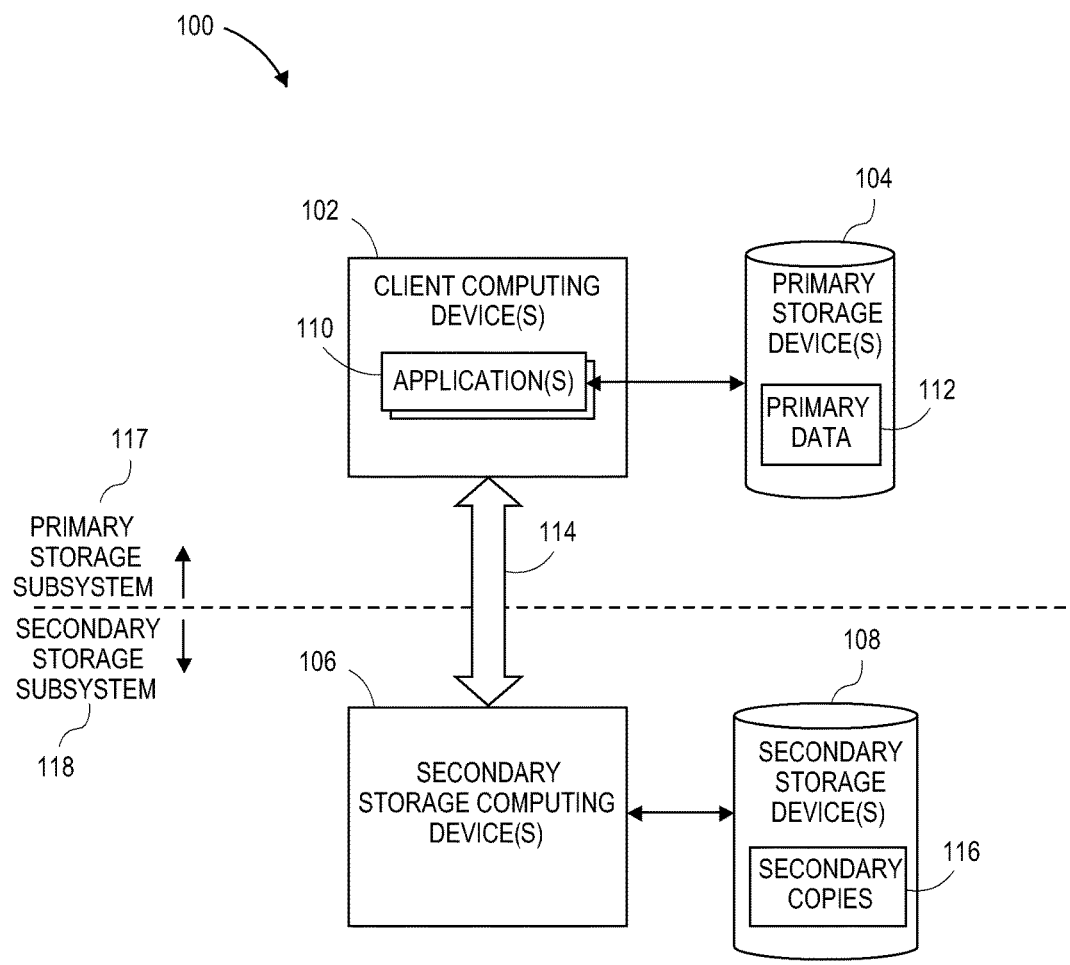
FIG. 1A is a block diagram illustrating an exemplary information management system.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";

U.S. Pat. No. 7,035,880, entitled "MODULAR BACKUP AND RETRIEVAL SYSTEM USED IN CONJUNCTION WITH A STORAGE AREA NETWORK";

U.S. Pat. No. 7,343,453, entitled "HIERARCHICAL SYSTEMS AND METHODS FOR PROVIDING A UNIFIED VIEW OF STORAGE INFORMATION";

U.S. Pat. No. 7,395,282, entitled "HIERARCHICAL BACKUP AND RETRIEVAL SYSTEM";

U.S. Pat. No. 7,246,207, entitled "SYSTEM AND METHOD FOR DYNAMICALLY PERFORMING STORAGE OPERATIONS IN A COMPUTER NETWORK";

U.S. Pat. No. 7,747,579, entitled "METABASE FOR FACILITATING DATA CLASSIFICATION";

U.S. Pat. No. 8,229,954, entitled "MANAGING COPIES OF DATA";

U.S. Pat. No. 7,617,262, entitled "SYSTEM AND METHODS FOR MONITORING APPLICATION DATA IN A DATA REPLICATION SYSTEM";

U.S. Pat. No. 7,529,782, entitled "SYSTEM AND METHODS FOR PERFORMING A SNAPSHOT AND FOR RESTORING DATA";

U.S. Pat. No. 8,230,195, entitled "SYSTEM AND METHOD FOR PERFORMING AUXILIARY STORAGE OPERATIONS";

U.S. Pat. No. 8,364,652, entitled "CONTENT-ALIGNED, BLOCK-BASED DEDUPLICATION";

U.S. Pat. Pub. No. 2006/0224846, entitled "SYSTEM AND METHOD TO SUPPORT SINGLE INSTANCE STORAGE OPERATIONS";

U.S. Pat. Pub. No. 2009/0329534, entitled "APPLICATION-AWARE AND REMOTE SINGLE INSTANCE DATA MANAGEMENT";

U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
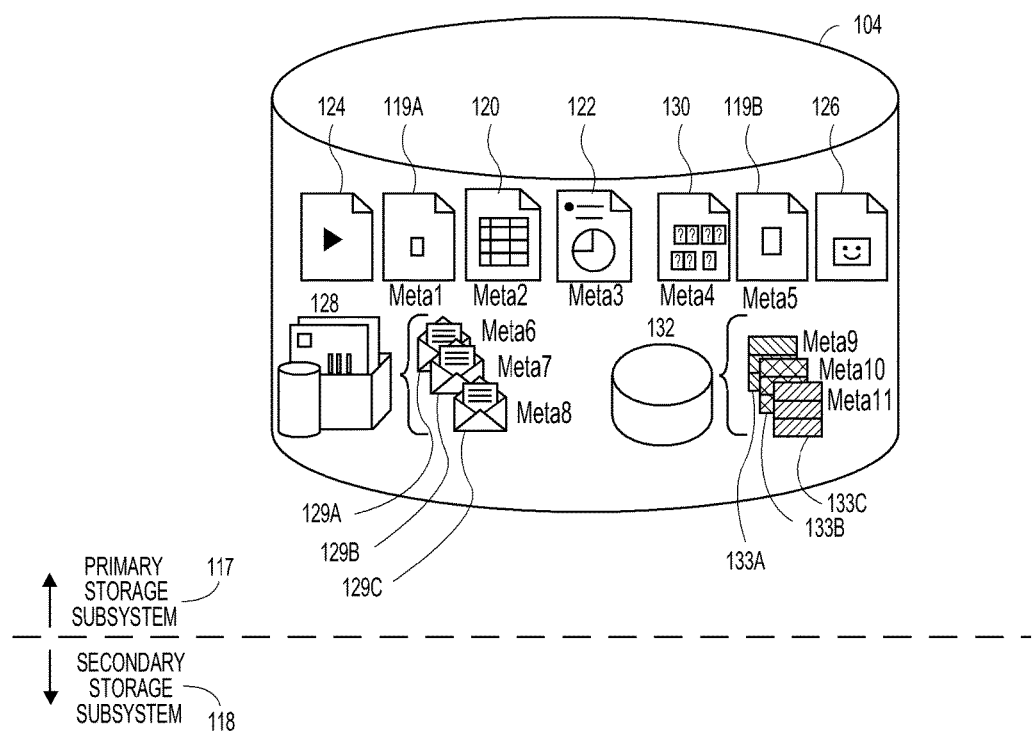
FIG. 1B is a detailed view of a primary storage device, a secondary storage device, and some examples of primary data and secondary copy data.
Figure 1B:
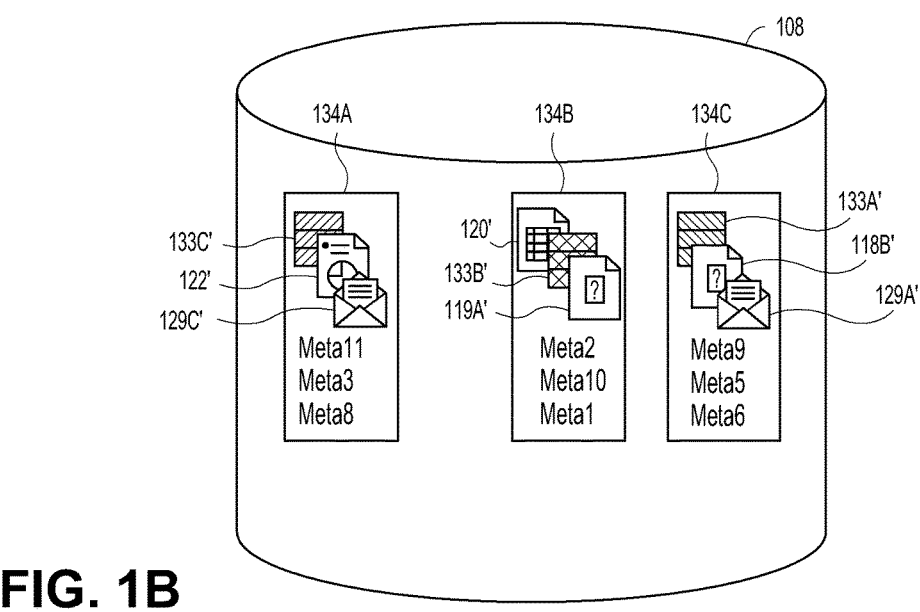

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Meta1-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
- initiating execution of secondary copy operations;
- managing secondary storage devices 108 and inventory/capacity of the same;
- allocating secondary storage devices 108 for secondary storage operations;
- monitoring completion of and providing status reporting related to secondary storage operations;
- tracking age information relating to secondary copies 116, secondary storage devices 108, and comparing the age information against retention guidelines;
- tracking movement of data within the information management system 100;
- tracking logical associations between components in the information management system 100;
- protecting metadata associated with the information management system 100; and
- implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
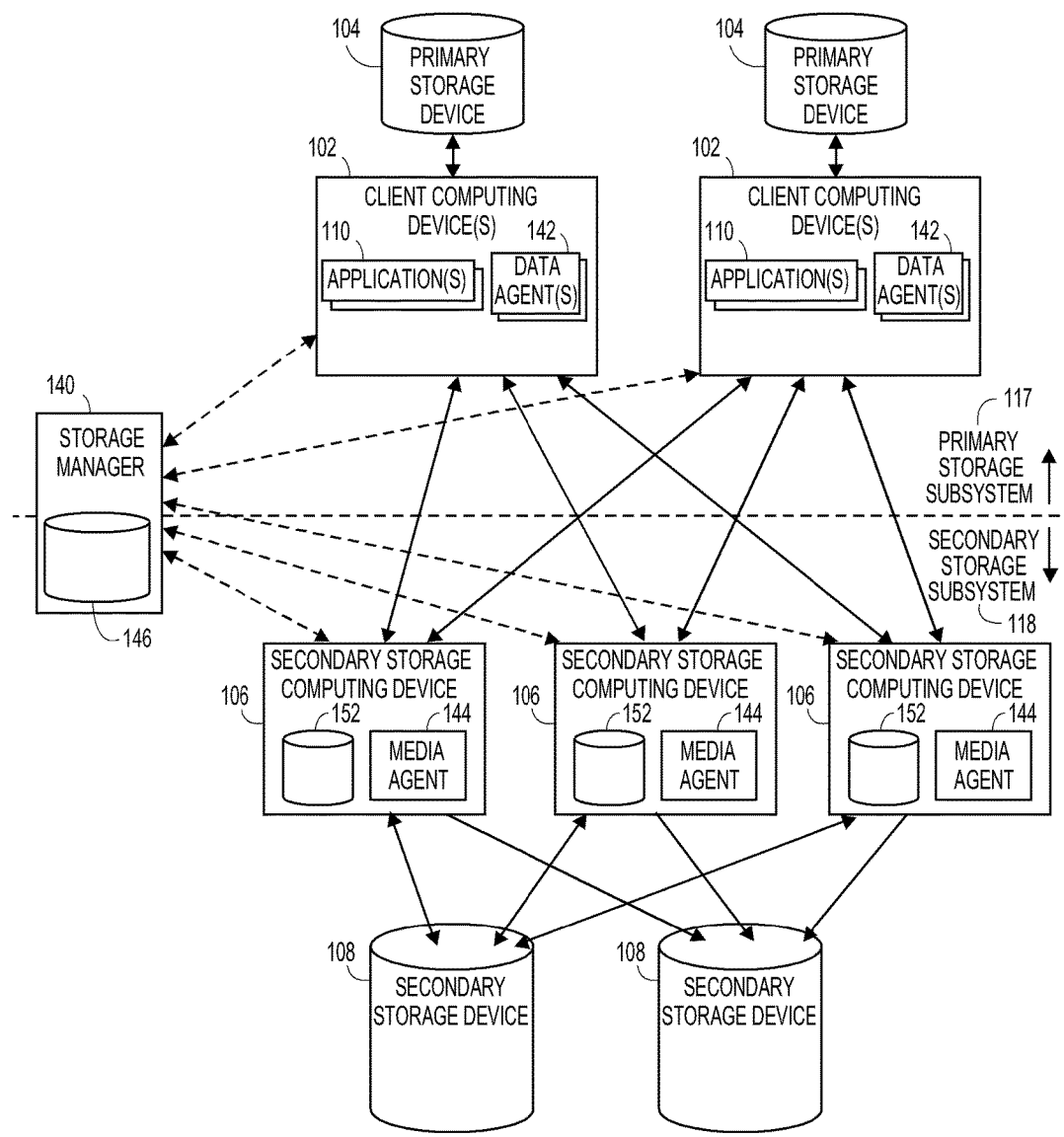
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108.

Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups.

Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub-file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of secondary copy 116 and/or secondary copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
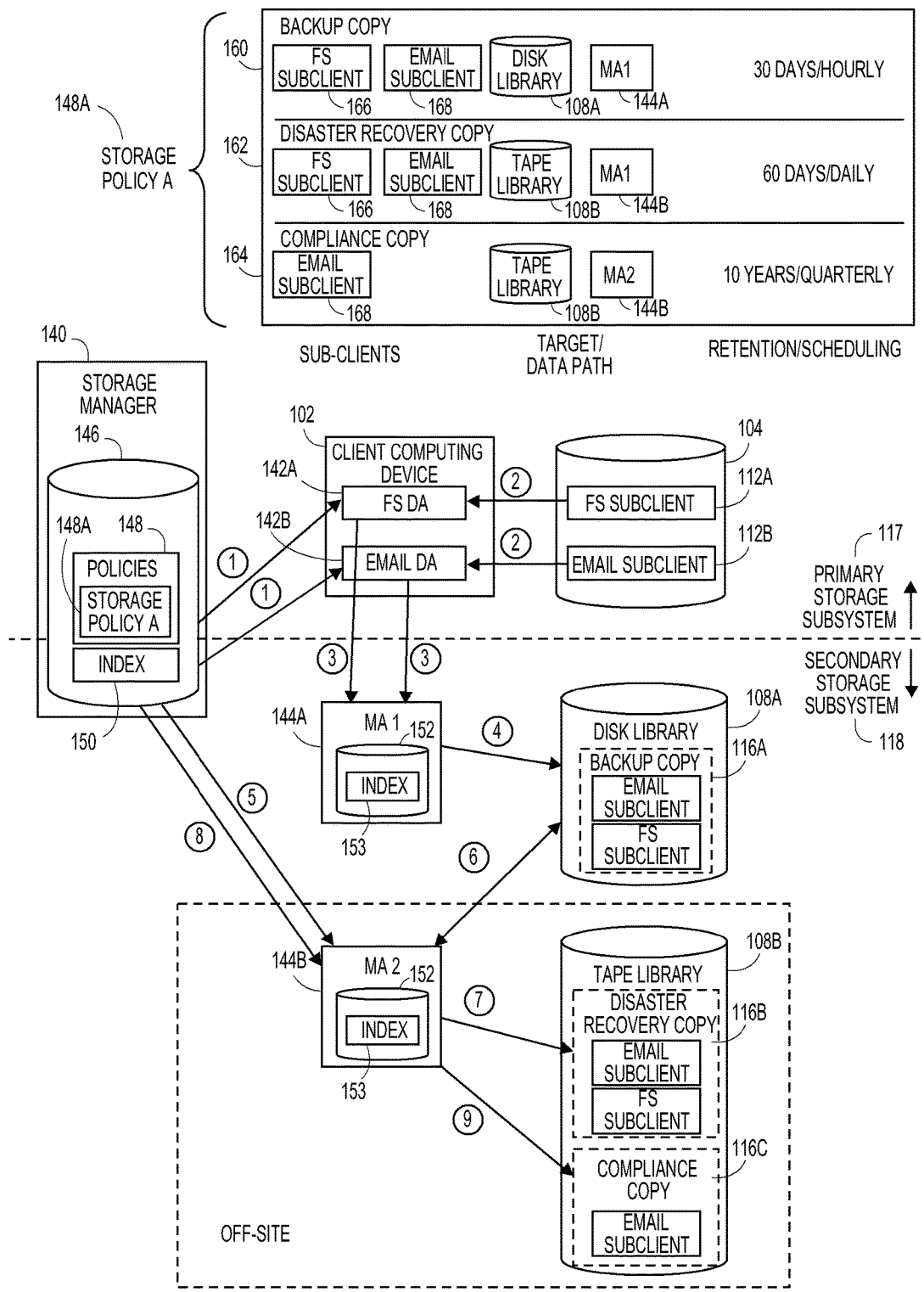
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 days retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 1168. In other embodiments, the compliance copy 116C is instead generated using either the primary data 1128 corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 1168, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

Lightweight Mounting of a Secondary Copy of File System Data Introduction

When searching through a secondary copy of production data, such as a back up, archive, or snapshot copy, for specific data objects, it may be beneficial to be able to view and browse the layout of a file system that organizes the secondary copy. Typical systems may allow a user to view the layout of a file system that organizes the secondary copies by mounting the entire file system to the user's computing device. Mounting the file system to the user's computing device may allow a user to view and browse the files, directories or other data objects in the secondary copy. However, such mounting often requires the user's computing device to also retrieve all of the files or other data objects in the secondary copy. Retrieving all of the files in the secondary copy may be time consuming, since the amount of data being stored is continuing to increase, and inefficient, since the user may only be looking for a few files, such as files that match a particular search criteria.

Accordingly, aspects of the disclosure provide a system that may reduce the demands placed on system resources and reduce the time consumed by a user when searching for a file. The system may allow a user to provide search criteria and to mount an abbreviated file system that identifies files, directories or other data objects in a secondary copy that match the search criteria. However, unlike typical systems, mounting the abbreviated file system may not involve retrieving all of the files in the secondary copy. Instead, the abbreviated file system may include just a listing of files in the secondary copy. Once a user selects, using the abbreviated file system, one or more data objects in the secondary copy that are of interest, the user's computing device may transmit a command to have the data objects retrieved (e.g., from a non-production secondary storage media).

Example Data Storage Environment

Figure 2:
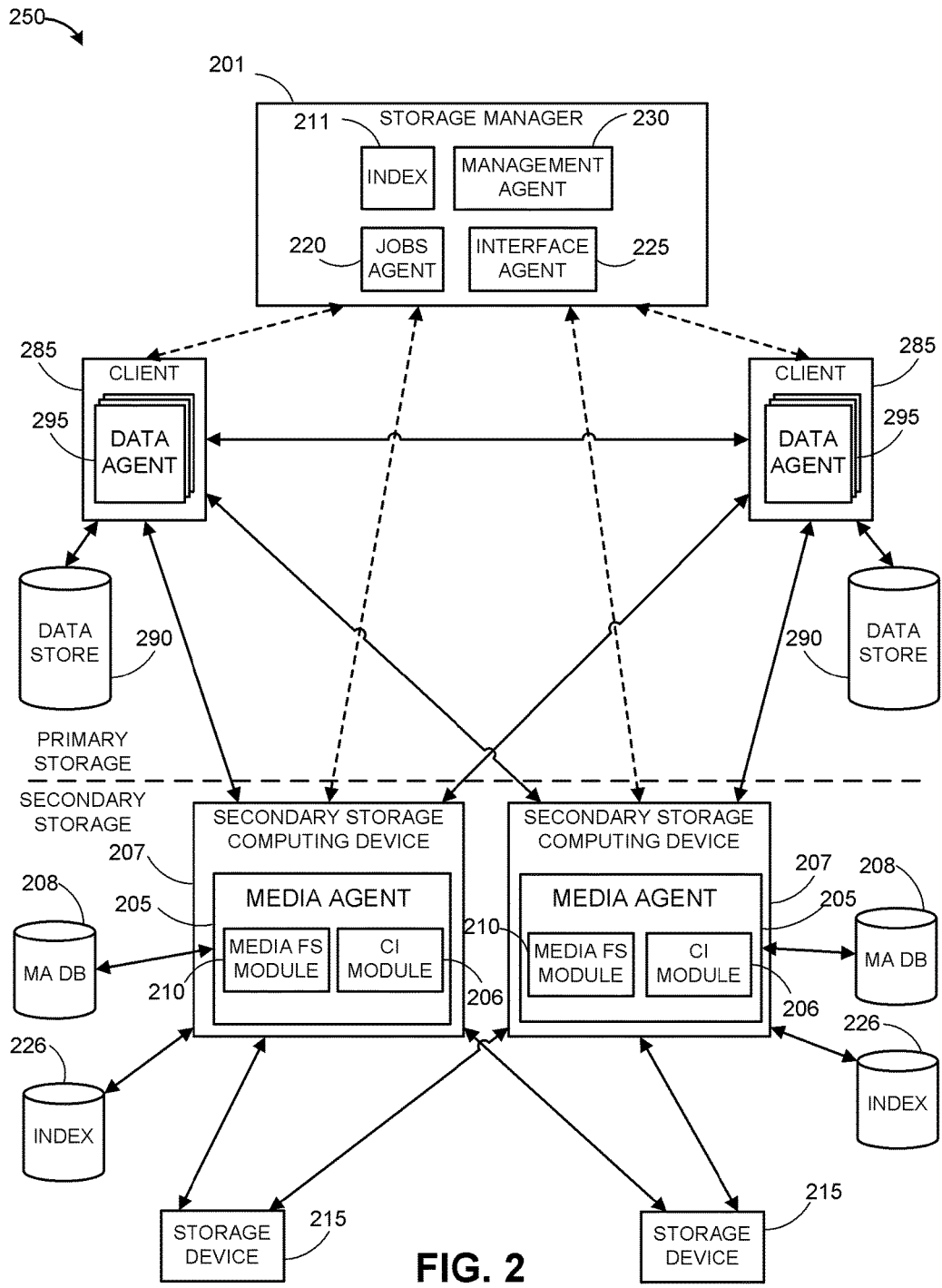
FIG. 2 is a block diagram illustrating an example data storage environment in which aspects of the inventive systems and methods may operate.

FIG. 2 is a block diagram illustrating an example arrangement of resources in a data storage environment. As shown, the data storage system 250 may generally include a storage manager 201, a data agent 295, a media agent 205, a secondary storage device 215, and, in some embodiments, may include certain other components such as a client 285, a primary data or information store 290, database or index 211, jobs agent 220, an interface module 225, and a management agent 230. Such a system and elements thereof are exemplary of a modular storage system such as the CommVault Simpana system available from CommVault Systems, Inc. of Oceanport, N.J., and further described in U.S. patent application Ser. No. 09/610,738, now U.S. Pat. No. 7,035,880, which is incorporated herein by reference, in its entirety.

A data storage system, such as the system 250, may generally include combinations of hardware and software components associated with performing storage operations on electronic data. According to some embodiments of the present disclosure, storage system 250 may be related to data storage cells and provide some or all of the functionality of data storage cells as described in U.S. patent application Ser.

No. 09/354,058, now U.S. Pat. No. 7,395,282 which is hereby incorporated by reference in its entirety.

The system of FIG. 2 can be configured to implement a mount view of a secondary copy of a file system or a portion thereof without having to retrieve the actual files or other data objects from secondary storage. For instance, in some cases, an abbreviated mount view is provided based on user provided search criteria. These techniques will be described in further detail herein, e.g., with respect to FIGS. 3A-5.

In accordance with certain embodiments of the present disclosure, storage operations performed by storage systems may include creating, storing, retrieving, and migrating primary storage data (e.g., stored on primary data store 290) and secondary storage data (which may include, for example, snapshot copies, backup copies, HSM copies, archive copies, and other types of copies of electronic data) stored on storage devices 215. In some embodiments, storage systems may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to various storage preferences, for example as expressed by a user preference or storage policy. A storage policy is generally a data structure or other information source that includes a set of preferences and other storage criteria associated with performing a storage operation. The preferences and storage criteria may include, but are not limited to, a storage location, relationships between system components, network pathway to utilize, retention policies, data characteristics, compression or encryption requirements, preferred system components to utilize in a storage operation, other criteria relating to a storage operation, combinations of the same and the like. Thus, in certain embodiments, a storage policy may indicate that certain data is to be stored in a specific storage device, retained for a specified period of time before being aged to another tier of secondary storage, copied to secondary storage using a specified number of streams. A storage policy may be stored in the storage manager database 211, to archive media as metadata for use in restore operations or other storage operations, or to other locations or components of the system.

In certain embodiments, a schedule policy may specify when to perform storage operations and how often and may also specify performing certain storage operations on sub-clients of data and how to treat those sub-clients. A sub-client may represent static or dynamic associations of portions of data of a volume and are typically mutually exclusive. Thus, in certain embodiments, a portion of data may be given a label and the association is stored as a static entity in an index, database or other storage location used by the system. Sub-clients may also be used as an effective administrative scheme of organizing data according to data type, department within the enterprise, storage preferences, combinations of the same or the like.

For example, an administrator may find it preferable to separate e-mail data from financial data using two different sub-clients having different storage preferences, retention criteria, or the like. Storage systems may contain not only physical devices, but also may represent logical concepts, organizations, and hierarchies. For example, a first storage system 250 may be configured to perform a first type of storage operations such as HSM operations, which may include backup or other types of data migration, and may include a variety of physical components including the storage manager 201 (or management agent 230), the media agent 205, the client component 285, and other components as described herein. A second storage system, or cell may contain the same or similar physical components, however, it may be configured to perform a second type of storage operations such as SRM operations, and may include as monitoring a primary data copy or performing other known SRM operations.

Thus, as can be seen from the above, although the first and second storage cells are logically distinct entities configured to perform different management functions (i.e., HSM and SRM respectively), each cell may contain the same or similar physical devices. Alternatively, in other embodiments, different storage cells may contain some of the same physical devices and not others. For example, a storage system configured to perform SRM tasks may contain the media agent 205, client 285, or other network device connected to a primary storage volume, while a storage cell configured to perform HSM tasks may instead include a media agent 205, client 285, or other network device connected to a secondary storage volume and not contain the elements or components associated with and including the primary storage volume. These two cells, however, may each include a different storage manager that coordinates storage operations via the same media agents 205 and storage devices 215. This "overlapping" configuration allows storage resources to be accessed by more than one storage manager 201 such that multiple paths exist to each storage device 215 facilitating failover, load balancing and promoting robust data access via alternative routes.

Alternatively, in some embodiments, the same storage manager 201 may control two or more cells (whether or not each storage cell has its own dedicated storage manager). Moreover, in certain embodiments, the extent or type of overlap may be user-defined (e.g., through a control console) or may be automatically configured to optimize data storage and/or retrieval.

Data agent 295 may be a software module or part of a software module that is generally responsible for copying, archiving, migrating, and recovering data from client computer 285 stored in a primary data or information store 290 or other memory location. Each client computer 285 may have at least one data agent 295 and the system can support multiple client computers 285. In some embodiments, data agents 295 may be distributed between client 285 and storage manager 201 (and any other intermediate components) or may be deployed from a remote location or its functions approximated by a remote process that performs some or all of the functions of data agent 295.

Embodiments of the present disclosure may employ multiple data agents 295 each of which may backup, migrate, and recover data associated with a different application. For example, different individual data agents 295 may be designed to handle Microsoft Exchange data, Lotus Notes data, Microsoft Windows file system data, Microsoft Active Directory Objects data, and other types of data. Other embodiments may employ one or more generic data agents 295 that can handle and process multiple data types rather than using the specialized data agents described above.

If a client computer 285 has two or more types of data, one data agent 295 may be required for each data type to copy, archive, migrate, and restore the client computer 285 data. For example, to backup, migrate, and restore all of the data on a Microsoft Exchange server, the client computer 285 may use one Microsoft Exchange Mailbox data agent 295 to backup the Exchange mailboxes, one Microsoft Exchange Database data agent 295 to backup the Exchange databases, one Microsoft Exchange Public Folder data agent 295 to backup the Exchange Public Folders, and one Microsoft Windows File System data agent 295 to backup the client computers 285 file system. In such embodiments, these data agents 295 may be treated as four separate data agents 295 by the system even though they reside on the same client computer 285.

Alternatively, other embodiments may use one or more generic data agents 295, each of which may be capable of handling two or more data types. For example, one generic data agent 295 may be used to back up, migrate and restore Microsoft Exchange 2000 Mailbox data and Microsoft Exchange 2000 Database data while another generic data agent may handle Microsoft Exchange 2000 Public Folder data and Microsoft Windows 2000 File System data, or the like.

Data agents 295 may be responsible for arranging or packing data to be copied or migrated into a certain format such as an archive file. Nonetheless, it will be understood this represents only one example and any suitable packing or containerization technique or transfer methodology may be used if desired. Such an archive file may include a list of files or data objects copied in metadata, the file and data objects themselves. Moreover, any data moved by the data agents may be tracked within the system by updating indexes associated appropriate storage managers or media agents.

Generally speaking, storage manager 201 may be a software module or other application that coordinates and controls storage operations performed by storage system 250. Storage manager 201 may communicate with some or all elements of storage system 250 including client computers 285, data agents 295, media agents 205, and storage devices 215, to initiate and manage system backups, migrations, and data recovery.

Storage manager 201 may include a jobs agent 220 that monitors the status of some or all storage operations previously performed, currently being performed, or scheduled to be performed by storage operation cell 250. Jobs agent 220 may be communicatively coupled with an interface agent 225 (typically a software module or application). Interface agent 225 may include information processing and display software, such as a graphical user interface ("GUI"), an application program interface ("API"), or other interactive interface through which users and system processes can retrieve information about the status of storage operations. Through interface 225, users may optionally issue instructions to various storage systems 250 regarding performance of the storage operations as described and contemplated by the present disclosure. For example, a user may modify a schedule concerning the number of pending snapshot copies or other types of copies scheduled as needed to suit particular needs or requirements. As another example, a user may employ the GUI to view the status of pending storage operations in some or all of the storage cells in a given network or to monitor the status of certain components in a particular storage cell (e.g., the amount of storage capacity left in a particular storage device).

Storage manager 201 may also include a management agent 230 that is typically implemented as a software module or application program. In general, management agent 230 provides an interface that allows various management components 201 in other storage operation cells 250 to communicate with one another. For example, assume a certain network configuration includes multiple cells 250 adjacent to one another or otherwise logically related in a WAN or LAN configuration (not shown). With this arrangement, each cell 250 may be connected to the other through each respective interface agent 225. This allows each cell 250 to send and receive certain pertinent information from other cells 250 including status information, routing information, information regarding capacity and utilization, or the like. These communication paths may also be used to convey information and instructions regarding storage operations.

For example, a management agent in a first storage cell may communicate with a management agent in a second storage cell regarding the status of storage operations in the second storage cell. Another illustrative example includes the case where a management agent in first storage cell communicates with a management agent 230 in a second storage cell to control the storage manager 201 (and other components) of the second storage cell via the management agent 230 contained in the storage manager 201.

Another illustrative example is the case where management agent 230 in the first storage cell 250 communicates directly with and controls the components in the second storage cell 250 and bypasses the storage manager 201 in the second storage cell. If desired, storage cells 250 can also be organized hierarchically such that hierarchically superior cells control or pass information to hierarchically subordinate cells or vice versa.

Storage manager 201 may also maintain an index, a database, or other data structure 211. The data stored in database 211 may be used to indicate logical associations between components of the system, user preferences, management tasks, media containerization and data storage information or other useful data, as described in greater detail in application Ser. No. 10/818,749, now U.S. Pat. No. 7,246,207, herein incorporated by reference in its entirety. For example, the storage manager 201 may use data from database 211 to track logical associations between media agent 205 and storage devices 215 (or movement of data as containerized from primary to secondary storage). In addition to the index 211, the storage system 250 can also include one or more indexes as part of the media agent 205.

The storage manager may control additional information management operations including ILM, deduplication, content indexing, data classification, data mining or searching, e-discovery management, collaborative searching, encryption, and compression.

Generally speaking, a media agent, which may also be referred to as or be implemented on a secondary storage computing device 207, may be implemented as software module that conveys data, as directed by storage manager 201, between a client computer 285 and one or more secondary storage devices 215 such as a tape library, a magnetic media storage device, an optical media storage device, solid state media, or any other suitable storage device. In one embodiment, secondary storage computing device 207 may be communicatively coupled with and control a secondary storage device 215. A secondary storage computing device 207 may be considered to be associated with a particular secondary storage device 215 if that secondary storage computing device 207 is capable of routing and storing data to particular secondary storage device 215.

In operation, a secondary storage computing device 207 associated with a particular secondary storage device 215 may instruct the storage device to use a robotic arm or other retrieval means to load or eject a certain storage media, and to subsequently archive, migrate, or restore data to or from that media. Secondary storage computing device 207 may communicate with a secondary storage device 215 via a suitable communications path such as a SCSI or fiber channel communications link. In some embodiments, the secondary storage device 215 may be communicatively coupled to a data agent 295 via a storage area network ("SAN"). As shown, in certain embodiments, each client 285 can communicate with any of the secondary storage computing devices 207, e.g., as directed by the storage manager 201. Moreover, each secondary storage computing device 207 can communicate with any of the secondary storage devices 215, e.g., as directed by the storage manager 201. Thus, storage operations can be routed to the secondary storage devices 215 in a dynamic and flexible manner. This inter-networked configuration provides both scalability and efficient component utilization. Further compatible examples of dynamic storage operations are provided in application Ser. No. 10/818,749, now U.S. Pat. No. 7,246,207.

Each secondary storage computing device 207 may maintain an index 226, a database, or other data structure 226 which may store index data generated during backup, migration, and restore and other storage operations as described herein. For example, performing storage operations on Microsoft Exchange data may generate index data. Such index data provides a secondary storage computing device 207 or other external device with a fast and efficient mechanism for locating data stored or backed up. Thus, in some embodiments, a secondary storage computing device index 226, or a storage manager index 211, may store data associating a client 285 with a particular secondary storage computing device 207 or storage device 215, for example, as specified in a storage policy, while a database or other data structure in secondary storage computing device 207 may indicate where specifically the client 285 data is stored in secondary storage device 215, what specific files were stored, and other information associated with storage of client 285 data. In some embodiments, such index data may be stored along with the data backed up in a secondary storage device 215, with an additional copy of the index data written to index cache in a secondary storage device 215. Thus the data is readily available for use in storage operations and other activities without having to be first retrieved from the secondary storage device 215.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from secondary storage device 215. In some embodiments, the cached information may include information regarding format or containerization of archive or other files stored on secondary storage device 215.

To perform its functions, the media agent 205 may include a media file system module 210, a content indexing module 206, and a media agent database 208. While not shown, the media agent 205 can further include a data classification module, a deduplication module, an encryption module, a compression module, a network module, and a distribution module.

The media file system module 210 is responsible for reading, writing, archiving, copying, migrating, restoring, accessing, moving, sparsifying, deleting, sanitizing, destroying, or otherwise performing file system operations on various secondary storage devices of disparate types. The media file system module 210 may also instruct the secondary storage device 215 to use a robotic arm or other retrieval means to load or eject certain storage media such as a tape. The media file system module 210 may also generate an abbreviated file system that can be mounted on a client computer 285, as described below with respect to FIGS. 3A-5.

The media agent(s) 205 can further include a content indexing module 206 configured to analyze the contents of primary or secondary copies of data objects and/or their associated metadata and to catalogue the results of this analysis, along with the storage locations of (or references to) the primary or secondary copies. This information can be stored in a content index stored within a database 208 associated with the media agent 205. The content index 206 can be stored in a storage device associated with the secondary storage computing device 207 on which the particular media agent resides, for instance. The results may also be stored elsewhere in the system, e.g., in the storage manager 201, along with a secondary copy of the data objects, and/or in an index cache. Such content index data provides the media agent 205 or another device with an efficient mechanism for locating primary copies and/or secondary copies of data objects that match particular criteria. The index data or other analyses of data objects or metadata may also be used by a data classification module (not shown) to associate data objects with classification identifiers (such as classification tags) in the media agent database (or other indices) to facilitate information management policies and searches of stored data objects.

The network module permits the media agent to communicate with other components within the system and hosted services via one or more proprietary and/or non-proprietary network protocols or APIs (including cloud service provider APIs, virtual machine management APIs, and hosted service provider APIs). The deduplication module performs deduplication of data objects and/or data blocks to reduce data redundancy in the cell. The deduplication module may generate and store data structures to manage deduplicated data objects, such as deduplication tables, in the media agent database 208. The encryption module performs encryption of data objects, data blocks, or secondary copies of objects to ensure data security in the cell. The compression module 585 performs compression of data objects, data blocks, or secondary copies of objects to reduce the data capacity needed in the cell.

The distribution module may be a set of instructions that coordinates the distribution of data objects and indices of data objects. The distribution may occur from one client computer 285 to another client computer 285 and/or from hosted services to client computers 285. As a first example, the distribution module may collect and manage data and metadata from hosted services or mobile devices. As another example, the distribution module may synchronize data objects or other objects that are modified on one client computer 285 so that the same modified objects are available on another client computer 285. As yet another example, the distribution module may distribute indices of data objects that originated from multiple client computers 285 and/or hosted services, so a user can access all of their data objects through a unified user interface or a native application on their client computer 285. The distribution module may also initiate "live browse" sessions to permit communications between different client computers 285 so that the devices 285 can interchange data and metadata or so the devices 285 can provide computing resources, such as applications, to each other.

In some embodiments, certain components may reside and execute on the same computer. For example, in some embodiments, a client computer 285, such as a data agent 295 or a storage manager 201, coordinates and directs local archiving, migration, and retrieval application functions as further described in U.S. patent application Ser. No. 09/610,738. This client computer 285 can function independently or together with other similar client computers 285.

Furthermore, components of the storage system of FIG. 2 can also communicate with each other via a computer network. For example, the network may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like.

Additionally, the various components of FIG. 2 may be configured for deduplication. For example, one or more of the clients 285 can include a deduplicated database. The data stored in the secondary storage devices 215 or primary stores 290 may also be deduplicated. For example, one or more of the media agents 205 associated with the respective secondary storage devices 215 can manage the deduplication of data in the secondary storage devices 215.

The storage system 250 can perform various types of storage operations, such as, for example, replication, snapshots, archiving and the like. A description of some storage operations compatible with embodiments described herein is provided near the end of this disclosure.

Search-Based Mount

As described above, the media agent(s) 205 may be configured to convey data between the client computer(s) 285 and one or more secondary storage devices 215. In some circumstances, a user of one of the client computers 285 may wish to search through data stored in the secondary storage devices 215 to identify and retrieve a particular data object or group of data objects (e.g., one or more files). The media agent 205 may be configured to deliver an abbreviated file system that can be mounted on the client computer 285. For instance, in some embodiments the abbreviated file system identifies secondary copies of data objects that meet the user's search criteria. The user may be able to browse the abbreviated file system and select any secondary copies of data objects that are of interest, and the media agent 205 may retrieve just the selected the data objects from secondary storage.

Figure 3A:
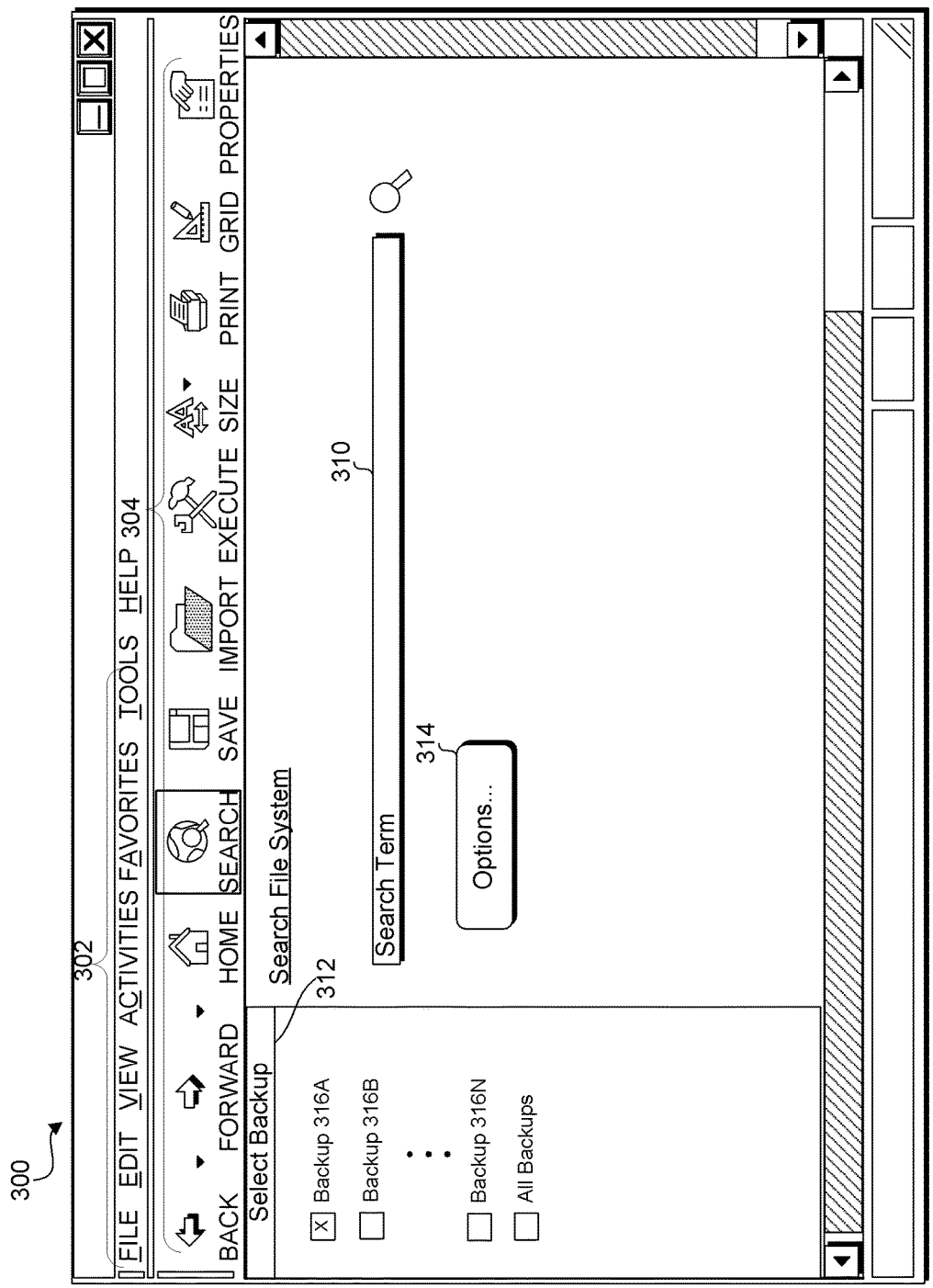
FIG. 3A depicts an illustrative user interface that enables a user to search through secondary copies of production data, such as backups, archives, and/or snapshots.

FIG. 3A depicts an illustrative user interface 300 that enables a user to search secondary copies such as backups, archives, and/or snapshots stored in the secondary storage device(s) 215. As illustrated, the user interface 300 includes various drop-down menus 302 and commands 304. One skilled in the art will appreciate that the drop-down menus 302 and the commands 304 can be organized, grouped, and displayed in a variety of different ways. The user interface 300 may be produced or hosted, for example, by the storage manager 201, and specifically the interface agent 225, described above with respect to FIG. 2.

Within the user interface 300, a user may be able enter search criteria. For instance, the user can enter a search term in box 310. In some embodiments, the user may also be able to refine the search. For example, in box 312 the user may be able to identify which backup, archive, or snapshot that the search should be performed in. For illustrative purposes only, backup 316A is selected as the backup that the search should be performed in. In addition, the user may be able to enter additional search criteria via the options button 314. Additional search criteria may include choosing to search for one or more file types within the file system that was backed up, archived, or a snapshot was taken of, choosing to search only specific folders in the file system, choosing to search for data objects that were generated, accessed, or modified during a certain time period, and the like.

In an embodiment, once the user has entered a search term and/or selected any additional search criteria, the search term(s) and/or other filtering criteria may be transmitted by the storage manager 201 to the appropriate media agent 205. As described above, the content indexing module 206 of a media agent 205 may generate a content index of a secondary copy (e.g., a backup, archive, or snapshot) and store it within the media agent database 208. The media agent 205, and in particular the content indexing module 206, may use the content index to locate secondary copies of data objects that match the search term and/or other search criteria.

In some embodiments, the media agent 205 may identify the data objects in the secondary copy that match the search term and/or criteria, but may not retrieve these copies from one or more of the secondary storage devices 215. Instead, for example, the media agent 205, via the media file system module 210, e.g., may generate an abbreviated file system that provides links or pointers to the copies of the data objects in the secondary copy that match the search term(s) and/or other filtering criteria. The links or pointers, however, may not point directly to the location where the copies of data objects in the secondary copy are stored. Rather, selection of the links or pointers may generate commands instructing the media agent 205 to retrieve the copy of the data object in the secondary copy.

The abbreviated file system may be structured as a file system tree, listing folders and data objects as they are structured in the file system that has been copied to secondary storage (e.g., backed up, archived, or had a snapshot taken). In an embodiment, the structure of the actual file system may be included in the content index and may be used to generate the abbreviated file system.

In some embodiments, just those folders and/or data objects that correspond to the copies of data objects in the secondary copy that match the search term(s) and/or other filtering criteria may be listed in the abbreviated file system. In other embodiments, all folders and data objects in the file system are listed in the abbreviated file system; however, folders or data objects that do not correspond to the copies of data objects in the secondary copy that match the search term(s) and/or other filtering criteria may be shaded or otherwise identified as not matching the search term(s) and/or other filtering criteria.

The client computer 285 may receive the abbreviated file system from the media agent 205. As described above, the client computer 285 may receive the abbreviated file system, but not the actual copies of the data objects from secondary storage that the abbreviated file system identifies. In an embodiment, the client computer 285 may mount the abbreviated file system. For example, the operating system of the client computer 285 may mount the abbreviated file system to make it accessible via the file system of the client computer 285. The abbreviated file system may appear as a new drive or partition within the file system of the client computer 285 (e.g., as the "E:\" drive).

Figure 3B:
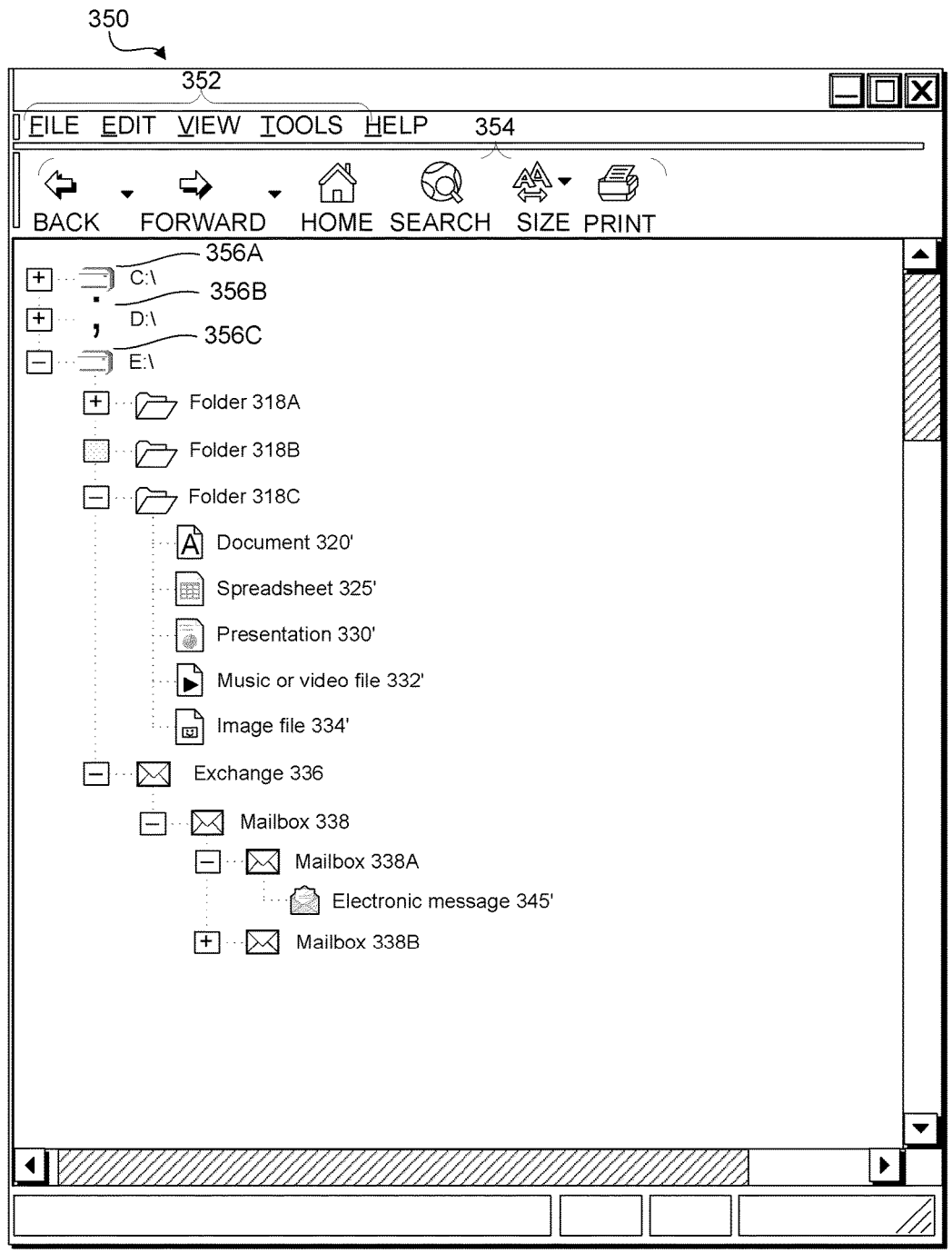
FIG. 3B depicts an illustrative user interface that enables a user to browse through an abbreviated file system.

FIG. 3B depicts an illustrative user interface 350 that enables a user to browse through the abbreviated file system. As illustrated, the user interface 350 includes various drop-down menus 352 and commands 354. One skilled in the art will appreciate that the drop-down menus 352 and the commands 354 can be organized, grouped, and displayed in a variety of different ways. The user interface 350 may be generated by the operating system of the client computer 285. In an embodiment, the user interface 350 represents the view produced by the operating system when a user attempts to browse through the file system of the client computer 285.

In an embodiment, the icon 356A represents the file system of the client computer 285 (e.g., the "C:\" drive), which may also be referred to as a primary copy or "live" version of the file system. The icon 356B represents an optical drive coupled to the client computer 285 (e.g., the "D:\" drive), and the icon 356C represents the mounted abbreviated file system (e.g., the "E:\" drive) representing a portion of the secondary copy of the file system. If, for example, a back up, archive, or snapshot had been taken of the C:\ drive at a previous time, the E:\ drive may represent the back up, archive, or snapshot.

Like with the C:\ drive and the D:\ drive, a user may browse the E:\ drive by expanding and contracting folders, such as folder 318A. However, as described above, the media agent 205 may not immediately retrieve the copies of data objects in the secondary copy that match the search term(s) and/or other filtering criteria. Accordingly, unlike the C:\ drive and the D:\ drive, which may provide a listing of folders and files and direct access to the files since they are stored locally, the E:\ drive merely provides a listing of folders and files. The copies of data objects in the secondary copy that correspond to the listed files are not stored locally in memory associated with the client computer 285. Instead, the copies of the data objects in the secondary copy remain in the one or more secondary storage devices 215. As described below, the listing of files in the abbreviated file system may include links or pointers, which may allow a user to retrieve a selected file from one or more of the secondary storage devices 215.

As illustrated in FIG. 3B, the abbreviated file system includes three folders, folder 318A, folder 318B, and folder 318C, and an email exchange folder 336. In an embodiment, folder 318A may be expanded as indicated by the "+" in the box to the left of the folder 318A icon. However, folder 318B may not be expanded as indicated by the fact that the box to the left of the folder 318B icon is shaded. Because folder 318A may be expanded, this may indicate that it includes a listing of a file that corresponds to a copy of a data object in the secondary copy that matches the search term(s) and/or other filtering criteria. Because folder 318B may not be expanded, this may indicate that it does not include a listing of any file that corresponds to a copy of a data object in the secondary copy that matches the search term(s) and/or other filtering criteria. While FIG. 3B illustrates folder 318B as being shaded, folder 318B may be marked in any way (e.g., a special icon, a different font, highlighting, etc.) to indicate that it does not include a list of a file that corresponds to a copy of a data object in the secondary copy that matches the search term(s) and/or other filtering criteria.

As illustrated in FIG. 3B, folder 318C is expanded, and includes a list of secondary copies of data objects that match the search term(s) and/or other filtering criteria. While FIG. 3B depicts folder 318C as including a document 320', a spreadsheet 325', a presentation 330', a music or video file 332', and an image file 334', the folder 318C may include or not include any type of file or data object. In addition, the folder 318C may only display those secondary copies of the data objects that correspond to the search term(s) and/or other filtering criteria. The actual file system from which the abbreviated file system was generated may include additional data objects in folder 318C that do not correspond to the search term(s) and/or other filtering criteria.

As illustrated in FIG. 3B, the email exchange folder 336 is also expanded, and includes a list of mailboxes 338A-B that each include secondary copies of data objects that match the search term(s) and/or other filtering criteria. Specifically, each mailbox 338A and 338B includes one or more electronic messages, such as electronic message 345', that match the search term(s) and/or other filtering criteria.

In an embodiment, a user may select any one or more of the data objects (e.g., by hovering over the listing, by clicking the listing, by double-clicking the listing, by a gesture, by voice commands, etc.) in order to retrieve the data objects from secondary storage. For example, if the user selects the image file 334', the client computer 285 may send a transmission to the media agent 205 indicating that the image file 334' has been selected. The media agent 205, for example via the media file system module 210, may retrieve the image file 334' from one or more of the secondary storage devices 215, and transmit the image file 334' to the client computer 285.

Abbreviated File System Building Process

Figure 4:
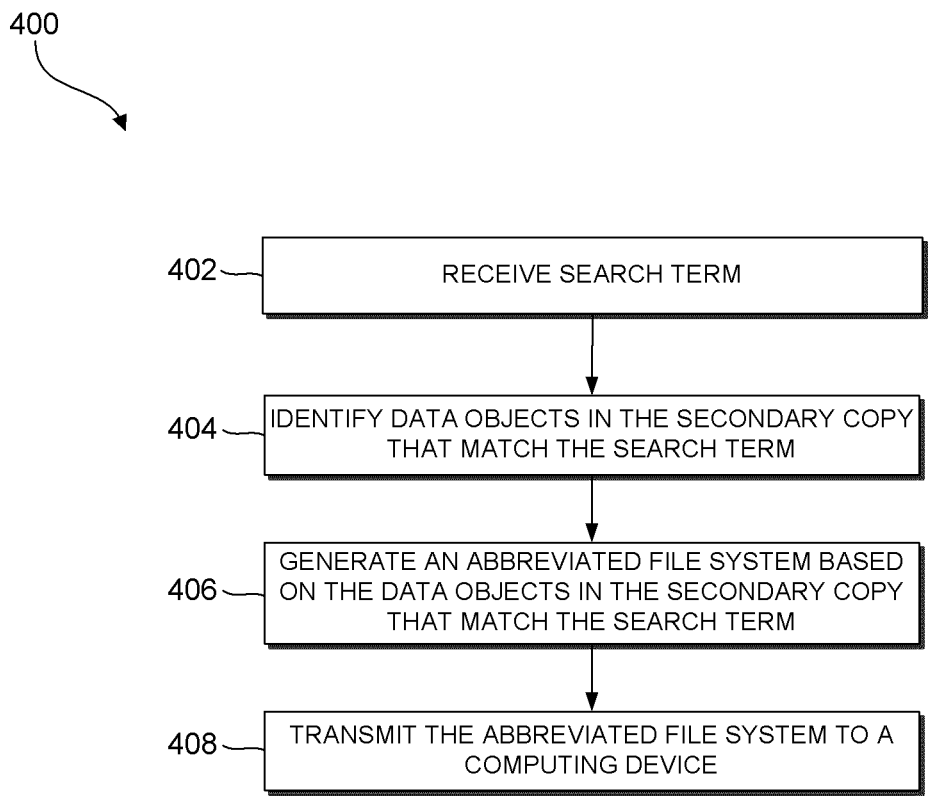
FIG. 4 shows a flow diagram illustrative of embodiments of a routine implemented by a media agent for generating an abbreviated file system.

FIG. 4 shows a flow diagram illustrative of embodiments of a routine 400 implemented by a media agent 205 for generating an abbreviated file system. The elements outlined for routine 400 may be implemented by one or more computing devices/components that are associated with the media agent 205. For example, routine 400 can be implemented by any one, or a combination of the network module, the content indexing module 206, the media file system module 210, and the like. Accordingly, routine 400 has been logically associated as being generally performed by the media agent 205, and thus the following illustrative embodiment should not construed as limiting.

At block 402, the routine 400 receives a search term and/or other filtering criteria, as previously discussed with respect to FIGS. 3A-B. In an embodiment, the search term may also include search criteria to further refine the search. In a further embodiment, the routine 400 may also receive information relating to which secondary copy (e.g., back up, archive, or snapshot) the search should be performed in. The search term and/or any additional filtering criteria may be received from a client computer 285 via the storage manager 201 (e.g., via the interface agent 225).

At block 404, the routine 400 identifies data objects in the secondary copy that match the search term or other filtering criteria. In an embodiment, the routine 400 may identify the data objects in the secondary copy by searching through a content index of the back up, archive, or snapshot that is to be searched and using the received search term or other filtering criteria. However, the routine 400 may only identify, and not retrieve, the data objects in secondary storage.

At block 406, the routine 400 generates an abbreviated file system based on the data objects in the secondary copy that match the search term. In an embodiment, the abbreviated file system comprises metadata representing a file tree and is structured similarly to or the same as the actual file system. The abbreviated file system may indicate which data objects in the secondary copy match the search term (and may only include a listing of those data objects that match the search term).

At block 408, the routine 400 transmits the abbreviated file system to the client computer 285. In an embodiment, an operating system of the client computer 285 may mount the abbreviated file system so that it appears and can be navigated via the file system of the client computer 285. As described above, the routine 400 may only transmit the abbreviated file system, not the actual data objects, to the client computer 285.

Abbreviated File System Mounting and Data Retrieval Process

Figure 5:
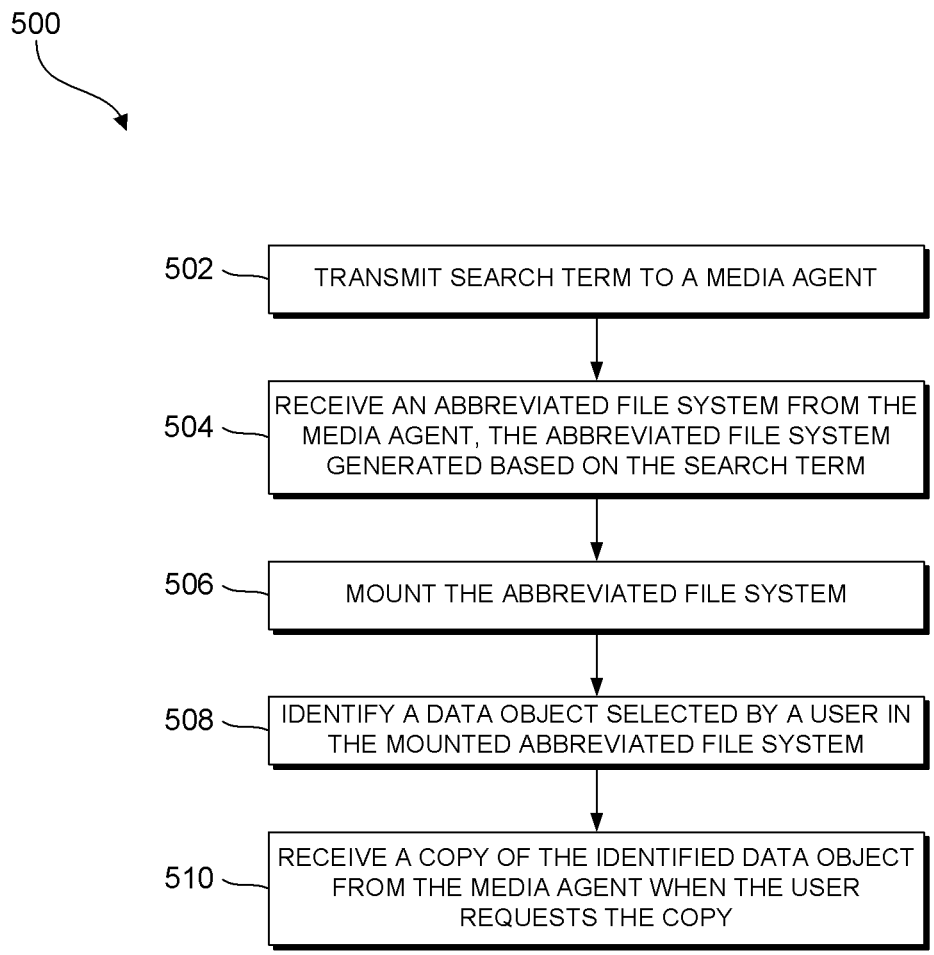
FIG. 5 shows a flow diagram illustrative of embodiments of a routine implemented by a computing device for mounting an abbreviated file system and retrieving a copy of a data object from secondary storage.

FIG. 5 shows a flow diagram illustrative of embodiments of a routine 500 implemented by a client computer 285 for mounting an abbreviated file system and retrieving a copy of a data object from secondary storage. The elements outlined for routine 500 may be implemented by one or more client computers/components that are associated with the client computer 285. For example, routine 500 can be implemented by any one, or a combination of the operating system of the client computer 285, an application running on the client computer 285, data agent 295, and the like. Accordingly, routine 500 has been logically associated as being generally performed by the client computer 285, and thus the following illustrative embodiment should not construed as limiting.

At block 502, the routine 500 transmits a search term to a media agent 205. In an embodiment, the search term may also include other criteria to further refine the filtering of the secondary copy data. In a further embodiment, the routine 500 may also transmit information relating to which secondary copy (e.g., back up, archive, or snapshot) the search should be performed in. The search term and any additional information may be transmitted via the storage manager 201 (e.g., via the interface agent 225).

At block 504, the routine 500 receives an abbreviated file system from the media agent 205, where the abbreviated file system was generated by the media agent based on the search and any additional information. In an embodiment, the abbreviated file system is represented as a file tree and structured similarly to the actual file system that was backed up, was archived, or a snapshot was taken of. The abbreviated file system may indicate which data objects in the secondary copy match the search term (and may only include a listing of those data objects that match the search term) or otherwise satisfy the filtering criteria. As described previously, the routine 500 may not receive the actual data objects at this point.

At block 506, the routine 500 mounts the abbreviated file system. In an embodiment, mounting the abbreviated file system means that it appears and can be navigated via the file system of the client computer 285, e.g., using a GUI such as the user interface 350 of FIG. 3B.

At block 508, the routine 500 identifies a data object selected by a user in the mounted abbreviated file system. In an embodiment, the abbreviated file system may include a list of folders and files, and links or pointers may be provided for those data objects that correspond to copies of the data objects in secondary storage that match the search term. In order to retrieve the data object, a user may select a data object in the abbreviated file system, via the user interface 350 or a command line, for example. The link or pointer may include a command instructing the media agent 205 to retrieve the selected data object. Once a file is selected, the routine 500 may send the command or instruction to the media agent 205.

At block 510, the routine 500 receives the data object that was selected. In an embodiment, the copy of the data object is received from one or more secondary storage devices 215 via the media agent 205 when the user requests the copy.

In some aspects, the abbreviated file system allows a user to search for and receive results identifying which data objects in the secondary copy match the user's search term(s) and/or other filtering criteria. Because the actual copies of the data objects are not transmitted to the user from secondary storage until the user specifically requests retrieval of the data objects (e.g., the data objects themselves are not transmitted to the user's device when the abbreviated file system is mounted), the search process may be less data-intensive, preserving resources and providing faster results. In addition, mounting the abbreviated file system may be more convenient for the user, as the user may search for and find the desired data by browsing through the file system of the user's computing device rather than via a separate application.

In further embodiments, an unabbreviated file system may be mounted in the same manner as the abbreviated file system described above. For example, before a search is performed, the media agent 205 may send an unabbreviated file system to the client computer 285 to be mounted. The unabbreviated file system may include just a listing of folders and files in the file system, but may include all folders and files in the file system (e.g., not just those folders and files that correspond to a data object in the secondary copy that matches a search term(s) and/or other criteria). A user may be able to view the unabbreviated file system in a user interface, such as the user interface 350, and retrieve any selected data objects in the secondary copy in the same manner as described above with respect to the abbreviated file system.

Further Embodiments and Explanation of Terminology

Storage operations compatible with embodiments described herein will now be described. For example, data can be stored in primary storage as a primary copy or in secondary storage as various types of secondary copies including, as a backup copy, a snapshot copy, a hierarchical storage management copy ("HSM"), an archive copy, and other types of copies.

A primary copy of data according to some embodiments is a production copy or other "live" version of the data which is used by a software application and is generally in the native format of that application. Such primary copy data is typically intended for short term retention (e.g., several hours or days) before some or all of the data is stored as one or more secondary copies, such as, for example, to prevent loss of data in the event a problem occurred with the data stored in primary storage.

Secondary copies can include point-in-time data and are typically intended for long-term retention (e.g., weeks, months or years) before some or all of the data is moved to other storage or is discarded. Secondary copies may be indexed so users can browse and restore the data at another point in time. After certain primary copy data is backed up, a pointer or other location indicia such as a stub may be placed in the primary copy to indicate the current location of that data.

One type of secondary copy is a backup copy. A backup copy in some embodiments is a copy of production data and, in some embodiments, can be stored in a backup format, e.g., as opposed to a native application format. For example, a backup copy may be stored in a backup format that facilitates compression and/or efficient long-term storage. Backup copies generally have relatively long retention periods and may be stored on media with slower retrieval times than other types of secondary copies and media. In some cases, backup copies may be stored at on offsite location.

Another form of secondary copy is a snapshot copy. From an end-user viewpoint, in some embodiments, a snapshot may be thought of as an instant image of the primary copy data at a given point in time. A snapshot generally captures the directory structure of a primary copy volume at a particular moment in time and may also preserve file attributes and contents. In some embodiments, a snapshot may exist as a virtual file system, parallel to the actual file system. Users typically gain read-only access to the record of files and directories of the snapshot. By electing to restore primary copy data from a snapshot taken at a given point in time, users may also return the current file system to the state of the file system that existed when the snapshot was taken.

A snapshot in some cases is created substantially instantly, using a minimum amount of file space, but may still function as a conventional file system backup. Some types of snapshots do not actually create another physical copy of all the data, but may simply create pointers that are able to map files and directories to specific disk blocks.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of copy-on-write snapshots, when a block changes in primary storage, the block is copied to secondary storage before the block is overwritten in primary storage. The snapshot mapping of file system data is also updated to reflect the changed block(s) at that particular point in time.

An HSM copy can be a copy of the primary copy data but typically includes only a subset of the primary copy data that meets a certain criteria and is usually stored in a format other than the native application format. For example, an HSM copy may include data from the primary copy that is larger than a given size threshold or older than a given age threshold and that is stored in a backup format. Often, HSM data is removed from the primary copy, and a stub is stored in the primary copy to indicate the new location of the HSM data. When a user requests access to the HSM data that has been removed or migrated, systems use the stub to locate the data and often make recovery of the data appear transparent, even though the HSM data may be stored at a location different from the remaining primary copy data.

An archive copy according to some embodiments is generally similar to an HSM copy. However, the data satisfying criteria for removal from the primary copy is generally completely removed with no stub left in the primary copy to indicate the new location (i.e., where the archive copy data has been moved to). Archive copies of data are sometimes stored in a backup format or other non-native application format. In addition, archive copies are generally retained for very long periods of time (e.g., years) and, in some cases, are never deleted. In certain embodiments, such archive copies may be made and kept for extended periods in order to meet compliance regulations or for other permanent storage applications.

In some embodiments, application data over its lifetime moves from more expensive quick access storage to less expensive slower access storage. This process of moving data through these various tiers of storage is sometimes referred to as information lifecycle management ("ILM"). This is the process by which data is "aged" from forms of primary storage with faster access/restore times down through less expensive secondary storage with slower access/restore times. For example, such aging may occur as data becomes less important or mission critical over time.

Similar data transfers associated with location-specific criteria are performed when restoring data from secondary storage to primary storage. For example, to restore data a user or system process generally must specify a particular secondary storage device, piece of media, or archive file. Thus, the precision with which conventional storage management systems perform storage operations on electronic data is generally limited by the ability to define or specify storage operations based on data location.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A system comprising:
   one or more computing devices configured to:
   transmit filtering criteria to a secondary storage subsystem, the secondary storage subsystem including one or more secondary storage devices that contain a secondary copy of at least a portion of a file system;
   receive, at the secondary storage subsystem, the filtering criteria;
   determine, by the secondary storage subsystem, an abbreviated version of the secondary copy that satisfy the filtering criteria, wherein the abbreviated version of the secondary copy comprises an identification of one or more data objects in the secondary copy that satisfy the filtering criteria, wherein the identification corresponds to a subset of the data objects in the secondary copy;
   retrieve, by the secondary storage subsystem, metadata corresponding the abbreviated version;
   receive, from the secondary storage subsystem, metadata corresponding to the abbreviated version of the secondary copy;
   mount the abbreviated version of the secondary copy;
   display the abbreviated version of the secondary copy within a graphical user interface;
   receive an indication of a selection of an identification of a first data object in the one or more data objects;
   transmit, to the secondary storage subsystem, a request for a copy of the selected first data object; and
   receive the copy of the selected first data object from the secondary storage subsystem.

2. The system of claim 1, wherein the filtering criteria comprises a search term comprising text.

3. The system of claim 2, wherein the abbreviated version of the secondary copy comprises an identification of the one or more data objects in the secondary copy including one or more instances of the text and an identification of one or more data objects in the secondary copy not including one or more instances of the text, and wherein the identification of each data object including one or more instances of the text is identified differently than the identification of each data object not including one or more instances of the text.

4. The system of claim 1, wherein the abbreviated version of the secondary copy comprises links or pointers to copies of the data objects that match the filtering criteria.

5. The system of claim 4, wherein the links or pointers to the copies of the data objects generate commands instructing a media agent to retrieve the secondary copy of the data objects.

6. The system of claim 1, wherein a file structure of the abbreviated version of the secondary copy is the same as a file structure of the secondary copy.

7. The system of claim 1, wherein the filtering criteria is received by a media agent, wherein the media agent generates a content index of the secondary copy and uses the content index to locate secondary copies of data objects that match the filtering criteria.

8. A method for searching a file system, the method comprising:
   transmitting, by a computing device, filtering criteria to a secondary storage subsystem, the secondary storage subsystem including one or more secondary storage devices that contain a secondary copy of at least a portion of a file system comprising a plurality of files and directories;
   receiving, at the secondary storage subsystem, the filtering criteria;
   determining, by the secondary storage subsystem, an abbreviated version of the secondary copy that satisfy the filtering criteria, wherein the abbreviated version of the secondary copy comprises an identification of one or more data objects in the secondary copy that satisfy the filtering criteria, wherein the identification corresponds to a subset of the data objects in the secondary copy;
   retrieving, by the secondary storage subsystem, metadata corresponding the abbreviated version;
   receiving, from the secondary storage subsystem, metadata corresponding to the abbreviated version of the secondary copy;
   mounting the abbreviated version of the secondary copy;
   displaying the abbreviated version of the secondary copy within a graphical user interface;
   receiving an indication of a selection of an identification of a first file or directory of the plurality of files or directories;
   transmitting, to the secondary storage subsystem, a request for a copy of the selected file or directory; and
   receiving the copy of the selected first file or directory from the secondary storage subsystem.

9. The method of claim 8, wherein the filtering criteria comprises a search term comprising text.

10. The method of claim 9, wherein the version of the secondary copy comprises an identification of the plurality of the files and directories in the secondary copy including one or more instances of the text and an identification of the plurality of the files and directories in the secondary copy not including one or more instances of the text, and wherein the identification of each file and directory including one or more instances of the text is identified differently than the identification of each file and directory not including one or more instances of the text.

11. The method of claim 8, wherein the abbreviated version of the secondary copy comprises links or pointers to the copies of the data objects that match the filtering criteria.

12. The method of claim 11, wherein the links or pointers to the copies of the data objects generate commands instructing a media agent to retrieve the secondary copy of the data objects.

13. The method of claim 8, wherein a file structure of the abbreviated version of the secondary copy is the same as a file structure of the secondary copy.

14. The method of claim 8, wherein the filtering criteria is received by a media agent, wherein the media agent generates a content index of the secondary copy and uses the content index to locate secondary copies of data objects that match the filtering criteria.

15. Non-transitory physical computer storage comprising executable instructions stored thereon that, when executed in a processor, are configured to implement operations for searching a file system, the operations comprising:
 transmitting filtering criteria from a primary storage subsystem to a secondary storage subsystem, the secondary storage subsystem including one or more secondary storage devices that contain a secondary copy of at least a portion of a file system;
 receiving, at the secondary storage subsystem, the filtering criteria;
 determining, by the secondary storage subsystem, an abbreviated version of the secondary copy that satisfy the filtering criteria, wherein the abbreviated version of the secondary copy comprises an identification of one or more data objects in the secondary copy that satisfy the filtering criteria, wherein the identification corresponds to a subset of the one or more data objects in the secondary copy;
 retrieving, by the secondary storage subsystem, metadata corresponding the abbreviated version;
 receiving at the primary storage subsystem, from the secondary storage subsystem, the metadata corresponding to the abbreviated version of the secondary copy;
 displaying the abbreviated version of the secondary copy within a graphical user interface;
 receiving an indication of a selection of an identification of a first data object in the one or more data objects;
 transmitting, from the primary storage subsystem to the secondary storage subsystem, a request for a copy of the selected first data object; and
 receiving the copy of the selected first data object from the secondary storage subsystem.

16. A method for searching a file system, the method comprising:
 receiving, by a secondary storage subsystem, filtering criteria, the secondary storage subsystem including one or more secondary storage devices that contain a secondary copy of at least a portion of a file system;
 identifying data objects in the secondary copy that satisfy the filtering criteria;
 generating an abbreviated version of the secondary copy based on the identified data objects, wherein the abbreviated version of the secondary copy comprises an identification of one or more data objects in the secondary copy that are identified by the secondary storage subsystem as satisfying the filtering criteria, wherein the identification corresponds to a subset of the data objects in the secondary copy;
 transmitting the abbreviated version of the secondary copy to a computing device for display by the computing device in a graphical user interface;
 mounting the abbreviated version of the secondary copy;
 receiving a command from the computing device to retrieve a first data object in the one or more data objects selected by a user via the graphical user interface;
 retrieving the first data object from the secondary storage in response to receiving the command; and
 transmitting the retrieved first data object to the computing device.

17. The method of claim 16, wherein the filtering criteria comprises a search term comprising text.

18. The method of claim 17, wherein the version of the secondary copy comprises an identification of the one or more data objects in the secondary copy including one or more instances of the text and an identification of the one or more of data objects in the secondary copy not including one or more instances of the text, and wherein the identification of each file and directory including one or more instances of the text is identified differently than the identification of each file and directory not including one or more instances of the text.

19. The method of claim 16, wherein the abbreviated version of the secondary copy comprises links or pointers to the copies of the data objects that match the filtering criteria.

20. The method of claim 16, wherein the links or pointers to the copies of the data objects generate commands instructing a media agent to retrieve the secondary copy of the data objects.

21. The method of claim 16, wherein a file structure of the abbreviated version of the secondary copy is the same as a file structure of the secondary copy.

22. The method of claim 16, wherein the filtering criteria is received by a media agent, wherein the media agent generates a content index of the secondary copy and uses the content index to locate secondary copies of data objects that match the filtering criteria.

\* \* \* \* \*